(12) United States Patent
Haunstein et al.

(10) Patent No.: US 7,184,477 B2
(45) Date of Patent: Feb. 27, 2007

(54) DECISION FEEDBACK STRUCTURE WITH SELECTIVE SAMPLING PHASE CONTROL

(75) Inventors: Herbert Haunstein, Nuremberg (DE); Frank Kunz, Nuremberg (DE); Thomas Fred Link, Nuremberg (DE); Konrad Sticht, Eschenbach (DE)

(73) Assignee: Lucent Technologies, Inc., Murray Hill, NJ (US)

( * ) Notice: Subject to any disclaimer, the term of this patent is extended or adjusted under 35 U.S.C. 154(b) by 767 days.

(21) Appl. No.: 10/351,917

(22) Filed: Jan. 27, 2003

(65) Prior Publication Data

US 2003/0142740 A1 Jul. 31, 2003

(30) Foreign Application Priority Data

Jan. 28, 2002 (EP) .................... 02250544

(51) Int. Cl.
*H03H 7/30* (2006.01)
*H04L 7/00* (2006.01)
(52) U.S. Cl. ................ 375/233; 375/355; 375/371
(58) Field of Classification Search .......... 375/233, 375/355, 371, 373, 376
See application file for complete search history.

(56) References Cited

U.S. PATENT DOCUMENTS

| 5,896,391 A * | 4/1999 | Solheim et al. ............. 714/704 |
| 6,178,213 B1 | 1/2001 | McCormack et al. |
| 6,625,772 B1 | 9/2003 | Stoll .......................... 714/746 |

FOREIGN PATENT DOCUMENTS

| DE | 197 17 642 A1 | 11/1998 |
| EP | 0 469 647 A2 | 2/1992 |
| WO | WO 99/12315 | 3/1999 |

OTHER PUBLICATIONS

Kawai, M. et al: "Smart Optical Receiver with Automatic Decision Threshold Setting and Retiming Phase Alignment" Proceedings of the European Conference on Optical Communication (ECOC), vol. 1, Sep. 10-14, 1989, pp. 320-323, XP000437795 Chalmers Univerisity, Gothenburg.
Winters, J. H. et al: "Electrical Signal Processing Techniques in Long-Haul, Fiber-Optical Systems" International Conference on Communications. Including Supercomm Technical Sessions, vol. 2, Apr. 15-19, 1990, pp. 397-403, XP000146099, IEEE, New York, U.S.A., p. 400, col. 2, line 2-line 6-figure 5.

* cited by examiner

*Primary Examiner*—Jay K. Patel
*Assistant Examiner*—David B. Lugo

(57) ABSTRACT

A decision feedback structure for recovering a bit stream out of received signals is disclosed, wherein the sampling instant may be tuned in dependence of the sequence or pattern of the preceding bits so as to follow the bit sequence dependent instant of the maximum eye opening. The decision-feedback equalizer structure includes decision means for making a bit value decision at a sampling instant, a feedback path to feed back bit values to said decision means and means for adapting the sampling instant for a bit value decision made by said decision means with respect to the sampling phase depending on the bit values of preceding bits, in particular depending on the bit value of the previous bit.

11 Claims, 2 Drawing Sheets

DECISION FEEDBACK STRUCTURE WITH SELECTIVE SAMPLING PHASE CONTROL

CROSS REFERENCE TO RELATED APPLICATION

This application claims priority of European Application No. 02250544.0, filed Jan. 28, 2002.

FIELD OF THE INVENTION

The invention relates to a device and a method for signal equalization in a signal receiving unit comprising a Decision Feedback Equalizer, in particular to the adjustment of equalization parameters used to equalize the received signals and to a feed forward equalizer adapted to carrying out the adjusting method.

BACKGROUND OF THE INVENTION

Modern high capacity, long distance communication systems are usually based on fiber-optical data transmission. However, the signals will become more or less distorted due to various linear and nonlinear phenomena upon transmission over the optical transmission lines. In particular, chromatic dispersion (CD), polarization mode dispersion, chirp, extinction ratio, four wave mixing, self phase modulation and cross phase modulation are relevant for the distortions and thereby introduce intersymbol interference (ISI). Additional distortions may be introduced by various parasitic elements of the conversion circuitry.

Generally, these effects reduce the eye opening at the receiver and thereby lead to a reduced tolerable optical signal to noise ratio (OSNR).

In the optical receiver, the optical pulses are converted back into electrical signals. The digital data and sampling clock has to be derived from the analog signal by means of a clock and data recovery circuitry (CDR).

In order to improve the signal quality at the CDR circuit, it is known to apply adaptive equalization. The eye opening penalty caused by ISI may be reduced or removed by employing adaptive equalization, whereby the signal equalization is usually performed in the electrical domain of the optical receiver.

Additionally, forward error correction is frequently applied in order to increase the transmission performance for a given signal to noise ratio. In encoding for forward error correction, redundant bits are added to an incoming bit stream so that errors in transmission may be detected and corrected at the far end.

Different FEC-Coding-Schemes are used, such as so called in band or out band, BCH (Bose-Chaudhury-Hoequengheen) or RS (Reed-Solomon) codes which fit for Sonet/SDH digital wrapper formats. If the input error rate of the data stream is below the error correction capability of the respective error correction code, the bit errors can be corrected and estimates of a bit error ratio (BER) may be measured by using the additional information from the respective FEC-decoding scheme. Specifically, the number of errors that can be corrected amount to $(d-1)/2$, where d denotes the minimum number of bit positions by which code words for a particular code are different ("Hamming distance"). Thus, using FEC, the BER of the decoded output signals can be greatly reduced in comparison to the incoming signals received and converted by the optical receiver.

In order to increase the eye-opening before digitizing the received and converted signals, linear and non-linear equalizers are employed. Well known filters are feed forward equalizers (FFE) and decision feedback equalizers (DFE).

Particularly, decision-feedback equalization (DFE) is a widely-used technique for removing intersymbol interference where noise enhancement caused by a linear feed-forward equalizer (FFE) may introduce performance problems.

In order to digitize the received signals, currently implemented DFE structures utilize a regular sampling phase derived from the recovered clock by means of a narrowband clock recovery. Consequently, the derived sampling phase is slowly adapted and used for digitization of a large number of bits.

However, the optimum sampling instant or phase may vary depending on the signal history. Particularly, non-linear distortions may cause the position of the maximum eye opening to shift in time so that a CDR using a regular slowly varying sampling phase will miss the optimum instant for signal sampling.

SUMMARY OF THE INVENTION

It is an object of the invention to provide a decision feedback structure and a method for decision feedback equalization, wherein the sampling instant may be tuned in dependence of the sequence or pattern of the preceding bits so as to follow the instant of the maximum eye opening.

Accordingly, the invention teaches a decision-feedback equalizer structure to recover a bit stream out of received analog signals, which comprises a signal input, bit value decision means for making a bit value decision at a sampling instant and a feedback path to feed back bit values to the decision means, whereby the structure further comprises means for adapting the sampling instant for a bit value decision made by the decision means with respect to the sampling phase depending on the bit values of preceding bits, in particular depending on the bit value of the previous bit.

Owing to the fact that asymmetrical distortions as introduced by nonlinear transmission effects require bit pattern dependent sampling phases to match the optimum eye opening, a gain of margin for OSNR penalty and receiver power penalty can be achieved by adapting the sampling instant accordingly. Thus, in contrast to prior art devices, the inventive decision-feedback equalizer structure provides for bit pattern controlled adjustment of the actual sampling phase. The instant to sample the received signal is selected and/or adjusted on the basis of a sampling phase derived from a clock recovery circle and a delay which is adapted in dependence of preceding bit values. In order to select and/or adjust the actual sampling instant for the present bit to be recovered, previous bit values are fed back by means of a feedback loop. By choosing appropriate adapting or adjusting parameters, the sampling instant or sampling phase for a present decision can be shifted to hit the instant of the maximum eye opening.

According to the disclosed embodiment, the means for adapting the sampling instant for bit value decisions comprise at least two tunable delay buffers for tuning a first sampling instant for bit patterns including a preceding zero bit and a second sampling instant including a preceding one bit.

By providing tunable delay buffers for different bit patterns, each buffer can be tuned independently to gain versatile adaptation of the delay parameters to the characteristics of the transmission line.

The data stream may include a forward error correction code (FEC) which allows to improve the bit error rate (BER) for a given signal-to-noise ratio (SNR) by reducing stochastic distortions from optical or electrical noise and cross talk. For high bit rate transmission, FEC becomes more and more mature to increase the tolerable SNR on long haul transmissions. In encoding for forward error correction, redundant bits are added to a bit stream so that errors may be detected and corrected at the far end. The number of added bits may be up to the number of signal bits, resulting in a doubling of the data transmission rate for in given channel. However, in many cases redundant transmission by using FEC is beneficial due to a guaranteed low error rate. During forward error correction, conditional bit error rates may be estimated by counting faulty transmitted bits in dependence of preceding and succeeding bits. The ratios of conditional bit error rates provide information on deviations of decision thresholds and/or sampling phases from their optimum values. Likewise, these error rates may be used to shift the sampling instance. Ideally, if the values of decision thresholds and sampling phases are optimized, the conditional errors should be balanced. It is therefore advantageous to control the tunable delay buffers by conditional bit error rates estimated by forward error correction means.

The bit pattern dependent shift of the sampling instant may be transferred to the output signal which results in jitters of the clock of the output bit stream. In order to compensate this effect, the decision-feedback equalizer structure may advantageously comprise means for retiming the bit stream by using a clock signal recovered from the input signal.

Due to nonlinear distortions upon signal transmission, a bit pattern dependent shift of the level of the optimum decision threshold occurs in addition to the bit pattern dependent shift of the instant of the maximum eye opening. Therefore, it is advantageous to provide means for adaptively tuning the decision threshold for bit value decisions in dependence of the bit value of the preceding bit in order to gain optimum decision conditions.

Within the scope of the present invention, it is also contemplated to provide a method of recovering a bit stream from a received analog signal in a decision feedback structure. According to the method, a clock signal is recovered from the received analog signals, a sampling phase is generated from the clock signal, the input analog signal is compared with a decision threshold to come to a bit value decision at a time instant and a bit stream is generated on the basis of the bit value decisions, whereby the instant is adapted with respect to the sampling phase depending on previous bit value decisions, in particular depending on the preceding bit value decision.

Consequently, the method is appropriate to provide optimum performance for accurate recognition of transmitted bit sequences which have been subjected to nonlinear effects since the optimum sampling instant is strongly influenced by ISI.

Advantageously, the instance may be tuned by means of conditional bit error rates which have been estimated by forward error correction.

According to the disclosed embodiment, two sampling instants are tuned independently. More specifically, a first sampling instant is tuned which is utilized for the bit value decision if the preceding bit value is zero and a second sampling instant is tuned which is utilized for the bit value decision if the preceding bit value is one. For example, the tuning parameters may be controlled by the conditional bit error rates as estimated by forward error correction.

Owing to bit pattern or bit history dependent sampling phases, the bit period of the digitized output data may oscillate. Thus, in order to avoid this undesirable effect, it is advantageous to synchronize the output data. The synchronization may be advantageously accomplished by a retiming procedure using the clock recovered from the input data.

In order to improve the performance of the method, it is further advantageous to adaptively tune the decision threshold for a bit value decision in dependence of the bit value of the preceding bit.

DETAILED DESCRIPTION

Figure 1:
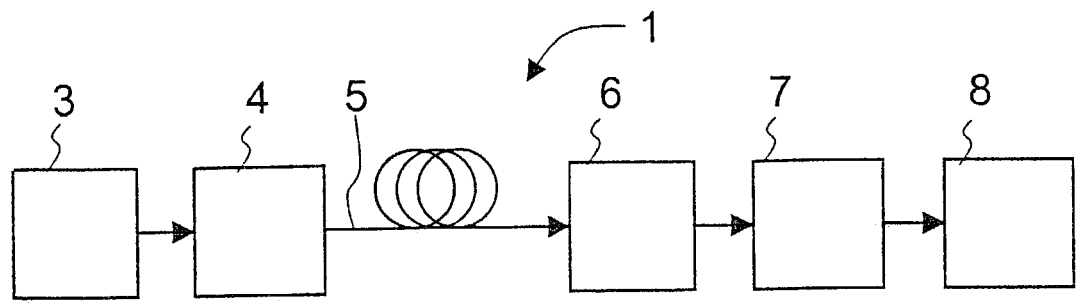
FIG. 1 is a scheme of an optical transmission channel.

Reference is now made to FIG. 1 showing components of an optical transmission channel 1, wherein the inventive feedback equalizer structure may be employed. Before transmission, data are processed in an FEC encoder 3 to provide a redundantly coded bit stream. The bit stream is converted into optical signals by means of an electrical to optical converter 4 and transmitted via a fiber 5 to the receiver at the far end. The receiver comprises an optical to electrical converter 6 and clock and data recovery circuitry 7 including a signal equalizer. The FEC-coded bit stream is then decoded by means of decoder 8. The decoder 8 may additionally monitor the transmission performance. The monitoring parameters, such as integral or conditional BER's may be used to adapt or tune the settings of other components of the transmission line. In particular, the signal equalizer at the receiver's side has to be adapted to variations in the transmission characteristics of the line.

However, due to nonlinear optical effects in the fiber, the optical signals arriving at the far end are more or less distorted and subjected to ISI, as discussed above.

Figure 2:
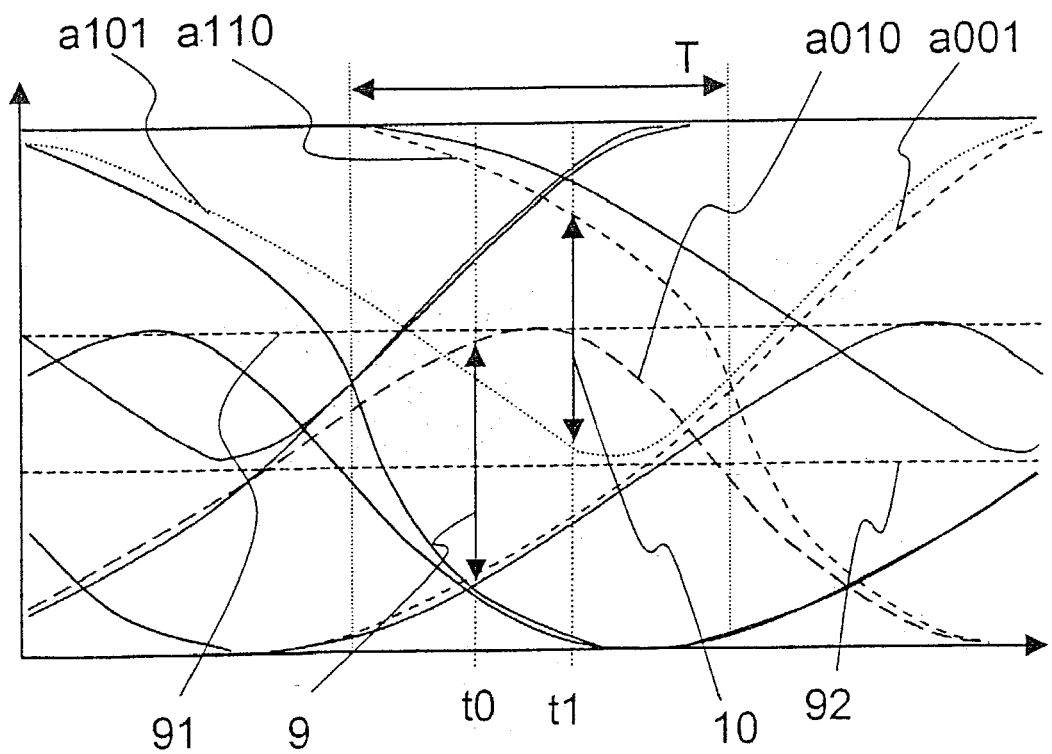
FIG. 2 shows eye diagrams of distorted signals.

FIG. 2 shows eye diagrams of distorted signals corresponding to various bit sequences. The arrows 9 and 10 indicate the maximum eye openings for signals having different signal histories. More detailed, arrows 9 and 10 denote the maximum eye opening for signal sequences having a preceding zero bit and one bit, respectively. Dashed lines 91 and 92 mark optimum decision thresholds for signals corresponding to bit sequences having a preceding zero bit (a010, a001) and a preceding one bit (a101, a110), respectively. Currently implemented DFE structures adapt the decision threshold level in dependence of the bit sequence to compensate this effect introduced by ISI.

However, as it is evident from the position of the arrows 91 and 92, the time instant of the maximum eye opening shifts depending on the signal history, too. In the case of a leading zero bit, the optimum instant lies at time t0, whereas a leading one bit shifts the instant to time t1. The DFE structure according to the present invention is capable to adapt the sampling instant depending on the signal history, resulting in an improved performance.

Figure 3:
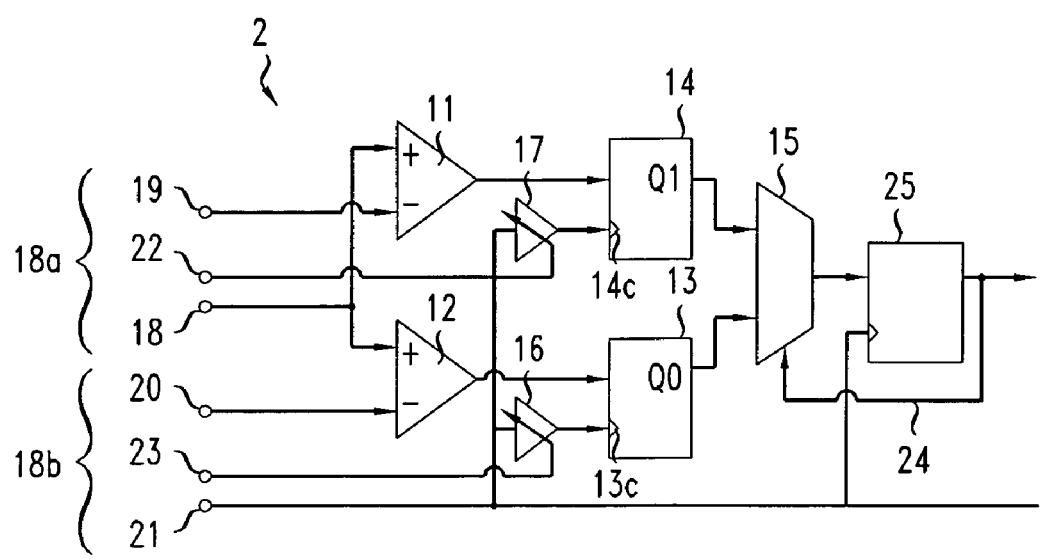
FIG. 3 depicts a schematic circuit diagram of a preferred embodiment of the invention.

Reference is now made to FIG. 3, showing a schematic circuit diagram of an exemplary one-tap embodiment of the inventive DFE structure 2. Data transmitted via an optical fiber are received as analog signals at input 18 after optical to electrical conversion. A clock signal generated by a clock recovery circuit is supplied via clock input 21. Input analog signals received at input 18 are converted into binary signals by means of comparators 11 and 12. Each of the comparators 11 and 12 is supplied with independent decision threshold signals via threshold inputs 19 and 20, respectively. In detail, comparator 12 is supplied with a decision threshold signal appropriate for bit sequences with a preceding zero bit and comparator 11 is supplied with a decision threshold signal appropriate for bit sequences with a preceding one bit. The threshold levels may be tuned in dependence of conditional bit error rates estimated by forward error correction means.

The binary output signals of comparators 11 and 12 are supplied to flip-flops 13 and 14, which in this embodiment are D-flip-flops. Signal sampling of the flip-flops is triggered by means of clock signals provided via clock inputs 13c and 14c, respectively. The clock signals are tapped from the clock signal recovered from the input data and supplied via clock input 21. The tapped clock signal is delayed by means of tunable delay buffers 16 and 17. In this way, input signals tapped via branch 18a are sampled using a sampling instant generated from the sampling clock by tunable delay buffer 17. The sampling clock is delayed appropriately to match the best sampling instant corresponding to bit sequences with a leading one bit (instant t0 in FIG. 2). Similarly, input signals tapped via branch 18b are sampled by flip-flop 13 using a sampling phase generated from the sampling clock by tunable delay buffer 16.

The delay generated by buffers 16, 17 is controlled by tuning parameters such as tuning voltages supplied via inputs 22 and 23, respectively. The tuning parameters are adapted to the characteristics of the transmission line. In example, the delay buffers 16 and 17 may be tuned in dependence of conditional bit error rates, which have been estimated by forward error correction so as to maintain optimum sampling conditions. Alternatively, the parameters may be tuned using look up table values. The table values may be calculated by means of an eye monitor or an analog-to-digital converter (ADC) and a least mean square algorithm.

At the output of flip-flops 13 and 14, digitized signals Q0, Q1 are provided, which are fed into multiplexer 15. In the multiplexer 15, output signals are generated by relaying one of the digitized signals Q0 and Q1. By means of a feedback path 24, the preceding bit signal is fed back into the multiplexer 15. A relaying decision is made on the basis of the preceding bit value, i.e., in the case of a preceding zero bit, signal Q0 is relayed, whereas signal Q1 is relayed in the case of a preceding one bit.

Due to the relaying operation of multiplexer 15, the output signals comprise a clock signal, which is a superposition of the delayed clock signals generated by tunable delay buffers 16 and 17. Consequently, the clock of the output bit stream includes a jitter which may cause interference with consecutive data processing devices such as forward error correction circuitry. In order to avoid undesirable effects due to clock jitter, the DFE structure 2 further provides for data retiming or synchronization. Retiming is accomplished by a further flip-flop 25 connected to the output of the multiplexer 15. Flip-flop 25 is triggered by the clock signal as recovered by the clock recovery circuitry of the receiver and supplied via clock input 21. In this way, a regular bit period in the output bit stream is obtained.

The embodiment described above is a one-tap DFE-structure. However, the concept of the DFE structure according to the present invention can be easily extended to multi-tap DFE-structures, whereby each tap corresponds to a specific sequence of preceding bits or a group of sequences of preceding bits.

The invention claimed is:

1. A decision-feedback equalizer structure for recovering a bit stream out of a received signal, comprising:
   a decision means for making a bit value decision at a sampling instant,
   a feedback path to feed back bit values to said decision means, and
   means for adapting the sampling instant for a bit value decision made by said decision means with respect to a sampling phase depending on bit values of at least one preceding bit, said means for adapting comprises comprising at least two tunable delay buffers for tuning a first sampling instant for bit patterns including a preceding zero bit and a second sampling instant for bit patterns including a preceding one bit.

2. The decision-feedback equalizer structure according to claim 1, wherein the bit value of the at least one preceding bit is the bit value of the previous bit.

3. The decision-feedback equalizer structure according to claim 1, wherein the at least two tunable delay buffers are controlled depending on conditional bit error rates estimated by forward error correction means.

4. The decision-feedback equalizer structure according to claim 1, further comprising means for retiming said bit stream using a clock signal recovered from the input signal.

5. The decision-feed back equalizer structure according to claim 1, further comprising means for adaptively tuning the decision threshold for bit value decisions in dependence of the bit value of the preceding bit.

6. A method of recovering a bit stream from a received analog signal in a decision feedback structure, comprising the steps of:
   recovering a clock signal from the received analog signal,
   generating a sampling phase from the recovered clock signal,
   at an instant, comparing the analog signal with a decision threshold to come to a bit value decision,
   generating a bit stream based on successive bit value decisions, and
   adapting said instant with respect to the sampling phase depending on at least one previous bit value decision, comprises comprising the steps of
   tuning a first sampling instant which is utilized for the bit value decision if the preceding bit value is zero and
   tuning a second sampling instant which is utilized for the bit value decision if the preceding bit value is one.

7. The method according to claim 6, wherein the at least one previous bit value decision is the preceding bit value decision.

8. The method according to claim 6, wherein the step of adapting said instant with respect to the sampling phase comprises the step of tuning said instant in dependence of conditional bit error rates estimated by means of forward error correction.

9. The method according to claim 6, further comprising the step of retiming said bit stream using a clock signal recovered from the input signal.

10. The method according to claim 6, further comprising, the step of adaptively tuning a decision threshold for a bit value decision in dependence of the bit value of the preceding bit.

11. An equalizer structure for recovering a bit stream out of a received signal, comprising:
- a decision means for making a bit value decision at a sampling instant,
- a feedback path to feed back bit values to said decision means, and
- means for adapting the sampling instant for a bit value decision made by said decision means with respect to a sampling phase depending on bit values of at least one preceding bit, said means for adapting comprising two independently adaptable branches in which the first branch tunes a first sampling instant for bit patterns including a preceding zero bit and the second branch tunes a second sampling instant for bit patterns including a preceding one bit.

* * * * *